Nov. 10, 1964 J. SPINA 3,156,757
SPECTACLE TEMPLE TENSIONER AND PIVOT PIN GUARD
AND METHOD OF TENSIONING TEMPLES
Filed Oct. 26, 1961
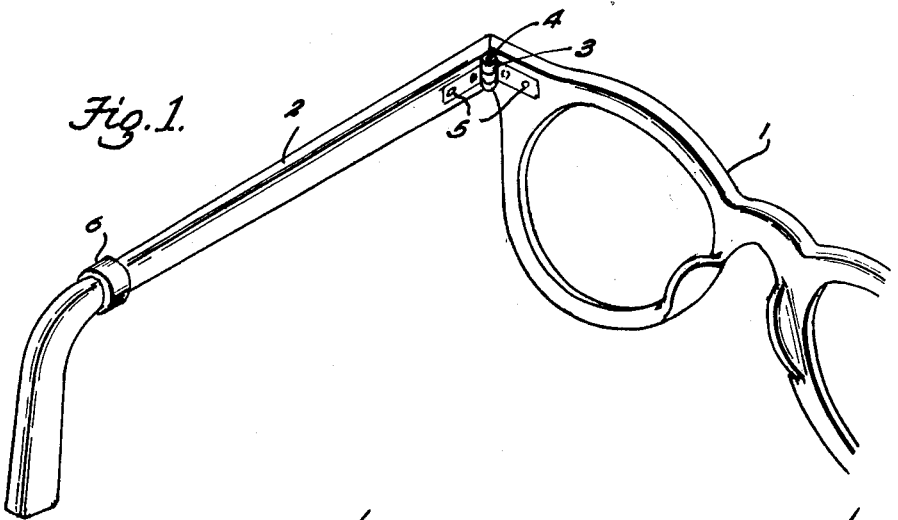
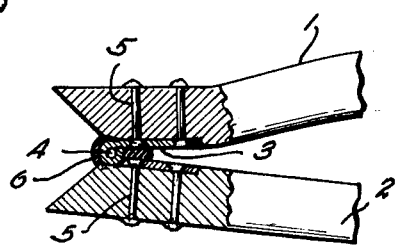
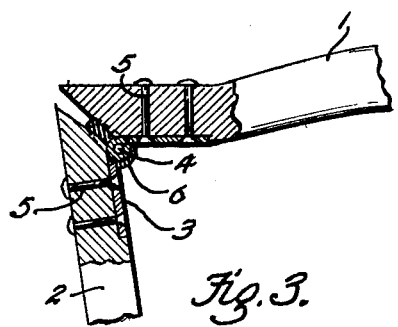
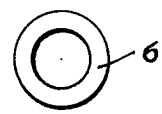
INVENTOR.
Joseph Spina
BY
*Hal H. M Fay*
Atty.

3,156,757
SPECTACLE TEMPLE TENSIONER AND PIVOT PIN GUARD AND METHOD OF TENSIONING TEMPLES
Joseph Spina, 3420 Washington Road,
West Palm Beach, Fla.
Filed Oct. 26, 1961, Ser. No. 147,794
2 Claims. (Cl. 88—53)

This invention relates to spectacle temple tensioners and hinge guards; and more particularly, is directed to a resilient cylindrical member adapted to surround the hinge pin of a hinge member connecting the frontal frame and temple of spectacles, and method of using same.

Spectacles have a tendency to move downward, particularly when the wearer is engaged in physical activities and the head declined.

An object of this invention is to provide resilient means for tensioning the temple against the wearer, when in use.

Another object of this invention is to provide a device of the class described which will prevent displacement of the hinge pin pivotally connecting the temple and frontal frame.

A further object of this invention is to provide a device of the class described which will be simple and economical and efficient and durable in use.

The foregoing and other objects and advantages of this invention will be more apparent from the following specifications, in connection with the drawings, forming a part thereof, wherein:

FIG. 1 is an angle view showing the temple, frontal frame and hinge, with the device of this invention positioned on the temple for movement to the hinge;

FIG. 2 is a cut-away view showing the device of this invention positioned around the hinge, with the temple folded towards the frontal frame;

FIG. 3 is a cut-away view, similar to FIG. 2, with the temple opening with respect to the frontal frame, to use position;

FIG. 4 is an end view of the device of this invention; and

FIG. 5 is a side elevation of the device of this invention.

Referring to the drawings, wherein like members are given the same reference numeral, a spectacle frontal frame 1 and temple 2 are pivotally connected by a hinge 3. The hinge 3 has a pin 4 about which the temple 2 and frontal frame 1 pivot by reason of the hinge plates being secured to the temple 2 and frontal frame 1, respectively, by any suitable means, such as rivets 5, as illustrated.

A resilient member 6, such as a cylindrical rubber member, is positioned around the temple and slidably moved to position it around the hinge member to longitudinally surround the hinge pin 4, and have a portion of the resilient member 6 positioned intermediate the abutting surfaces of the temple 2 and frontal frame 1.

Because spectacle frames are of varying sizes, for any particular frame, the inside diameter of the resilient member 6 is such that it will be under slight tension when positioned around the hinge pin 4; and, the length of the resilient member 6 is such that with the temple 2 opened for use; the resilient member 6 is deformed to exert slight pressure on the temple 2 to urge it towards the head of the spectacle wearer.

The invention as illustrated, is directed towards only one temple 2, it is clearly understood, however, that a resilient member 6 should be used on the hinge at each side of the frontal frame 1.

In packaging resilient members of different cross-sectional dimensions and lengths are packaged in pairs to meet the requirements of any particular spectacle frame. These resilient members may be conveniently formed from tubular rubber, synthetic rubber, or similar resilient materials by cutting to the desired lengths.

In operation, the resilient member 6 exerts pressure on the temple 2 urging it inwardly, and against the head of the wearer, to prevent the spectacle frame from sliding when in use; and, at the same time, the resilient member 6 prevents displacement of the hinge pin 4 and separation of the temple 2 from the frontal frame 1.

The invention has been described in detail, but it is understood that the invention is not so limited, because changes and modifications may be made in the illustrated embodiment of the invention as described, without departing from the spirit and scope thereof, as defined in the appended claims.

Having thus disclosed the invention, what is claimed as new and desired to secure by Letters Patent is:

1. In combination with a spectacle temple and frontal frame pivotally connected with a hinge having a hinge pin, cylindrical resilient member longitudinally surrounding the hinge pin and having a portion thereof intermediate the adjacent ends of said temple and frontal frame.

2. A method of tensioning spectacle temples and guarding the pivot pin of a hinge pivotally connecting said temple with the frontal frame of spectacles, comprising inserting a temple in a cylindrical resilient member, and slidably positioning said resilient member around said pivot pin with a portion of said resilient member intermediate adjacent ends of said temple and frontal frame.

References Cited by the Examiner
UNITED STATES PATENTS

| | | | |
|---|---|---|---|
| 2,145,307 | 1/39 | Hunt | 88—53 |
| 2,684,014 | 7/54 | Fairly | 88—53 |
| 2,761,353 | 9/56 | Eustis | 88—53 |

JEWELL H. PEDERSEN, *Primary Examiner.*
FREDERICK M. STRADER, *Examiner.*